United States Patent
Zellner, Jr. et al.

(10) Patent No.: US 7,422,261 B2
(45) Date of Patent: Sep. 9, 2008

(54) REINFORCING SUPPORT INCORPORATED INTO A GLOVE BOX RETAINING STRUCTURE LOCATED PROXIMATE A PIVOT ACTUATING HANDLE MECHANISM

(75) Inventors: Kerry Scott Zellner, Jr., Saline, MI (US); Atsushi Kobayashi, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 250 days.

(21) Appl. No.: 11/348,394

(22) Filed: Feb. 6, 2006

(65) Prior Publication Data

US 2007/0205624 A1    Sep. 6, 2007

(51) Int. Cl.
*B60R 7/06* (2006.01)
(52) U.S. Cl. .................. 296/37.12; 296/37.8; 224/483
(58) Field of Classification Search ............... 296/37.8, 296/37.12; 224/483
See application file for complete search history.

(56) References Cited

U.S. PATENT DOCUMENTS

| | | | | |
|---|---|---|---|---|
| 4,534,751 | A | 8/1985 | Fortuna et al. | 493/108 |
| 6,106,043 | A | 8/2000 | Izumo | 296/37.12 |
| 6,168,266 | B1 | 1/2001 | Ishinaga et al. | 347/86 |
| 6,490,792 | B1 | 12/2002 | Ishinaga et al. | 29/890.1 |
| 6,786,524 | B2 | 9/2004 | Tamura | 296/37.12 |
| 6,863,329 | B2 * | 3/2005 | Fero | 296/37.8 |
| 7,201,434 | B1 * | 4/2007 | Michalak et al. | 296/187.05 |
| 2002/0054986 | A1 | 5/2002 | Koike et al. | 428/304.4 |
| 2003/0207077 | A1 * | 11/2003 | Riha et al. | 428/120 |

FOREIGN PATENT DOCUMENTS

| | | |
|---|---|---|
| DE | 19810156 | 9/1998 |
| JP | 62284729 | 10/1987 |
| JP | 08230041 | 10/1996 |
| JP | 2005001559 | 6/2005 |

* cited by examiner

*Primary Examiner*—Lori L Lyjak
(74) *Attorney, Agent, or Firm*—Gifford, Krass, Sprinkle, Anderson & Citkowski, P.C.

(57) ABSTRACT

A pivotally actuated glove box mounted within a vehicle dashboard and exhibiting reinforcing support proximate a mounting location of an exterior handle mechanism. A volume-holding bin includes an inner panel secured to locations associated with the bin. Projecting portions defined upon an opposite surface of the inner panel align with selected inwardly directed support ribs associated with an outer panel and which is vibrational welded with said inner panel along contact locations established between said panels. The placement of the projecting portions coincides with the contact locations associated those inwardly directed support ribs of the outer panel which are proximate the location of a handle mechanism secured to an exposed face of the outer panel and which, upon actuating the handle mechanism, prevent damage to the inwardly contacting edges of the outer panel structural rib supports.

20 Claims, 2 Drawing Sheets

REINFORCING SUPPORT INCORPORATED INTO A GLOVE BOX RETAINING STRUCTURE LOCATED PROXIMATE A PIVOT ACTUATING HANDLE MECHANISM

BACKGROUND OF THE INVENTION

1. Field of the Invention

The present invention relates generally to a pivotally openable glove box incorporating a configured face constructed of vibration welded dual inner and outer panel layers. More specifically, the present invention teaches the incorporation of reinforcing supports located proximate selected vibration welded locations established between structural support ribs associated with inner and outer panels. The weld positions are proximate to a pivotally actuated exterior handle mechanism for unlatching the welded panel layers from locked engagement within an associated vehicle dashboard structure, thus permitting a connected bin portion to pivot outwardly to an exposed and open position.

2. Description of the Prior Art

A conventional vehicle glove box typically includes a three-dimensionally configured and volume-holding bin capable of being pivotally opened and closed relative to a face of a vehicle dashboard. A semi-planar and arcuately configured face portion is secured to forward locations of the bin and typically includes a fixed inner panel and a vibrationally welded outer panel.

Examples of vibrationally welded articles include the vehicle compartment cover disclosed in DE 19810156 and which discloses curved inner and outer parts bonded together by vibrational welding. Of note, the inner part has a welding rib facing towards the outer part, the outer part correspondingly including a further rib to prevent collapse of the welding rib during the vibration welding process. Other examples of vibrationally welded articles are further shown in Japanese Patent Publications No. 08-230041, entitled resin molded product, JP 2005-001559, entitled glove lid, and JP 62-284729, entitled vibratory welding process.

A problem associated with such vibration welded inner and outer faces concerns the welds located proximate to the mounting location of the unlatching handle. In use, repetitive unlatching rotation and/or "slamming shut" rotation of the exterior face of the glove box, such as by the user grasping the handle, tends to result in the vibrational welds in the region of the handle being broken or otherwise damaged, this further resulting in undesirable looseness or over-rotation of the handle and potential inoperability of the glove box locking mechanism.

SUMMARY OF THE PRESENT INVENTION

The present invention is a pivotally openable glove box incorporating vibration welded dual inner and outer panel layers. More specifically, the present invention teaches the incorporation of reinforcing supports, e.g. tab-shaped portions, associated with selected vibration welded locations established between grid-shaped rib supports associated with inner and outer panels located proximate to a mounting location of a pivotally actuated exterior handle mechanism.

The reinforcing supports provide lateral deflecting support at associated vibration welded contact locations associated with the inner and outer panel layers. The support construction, configured as spaced apart pairs of tab-shaped members integrally molded with the rib structure associated with the inner panel, locates and supports therebetween one or more inwardly contacting edges of structural rib supports associated with the outer panel.

In this fashion, the support structure prevents breakage or damage to the contact locations during unlatching or reclosing (slamming shut) of the welded panel layers within the associated vehicle dashboard structure, thus maintaining the mechanical and tactile structural feel and integrity of the graspable latching mechanism associated with the glove box.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
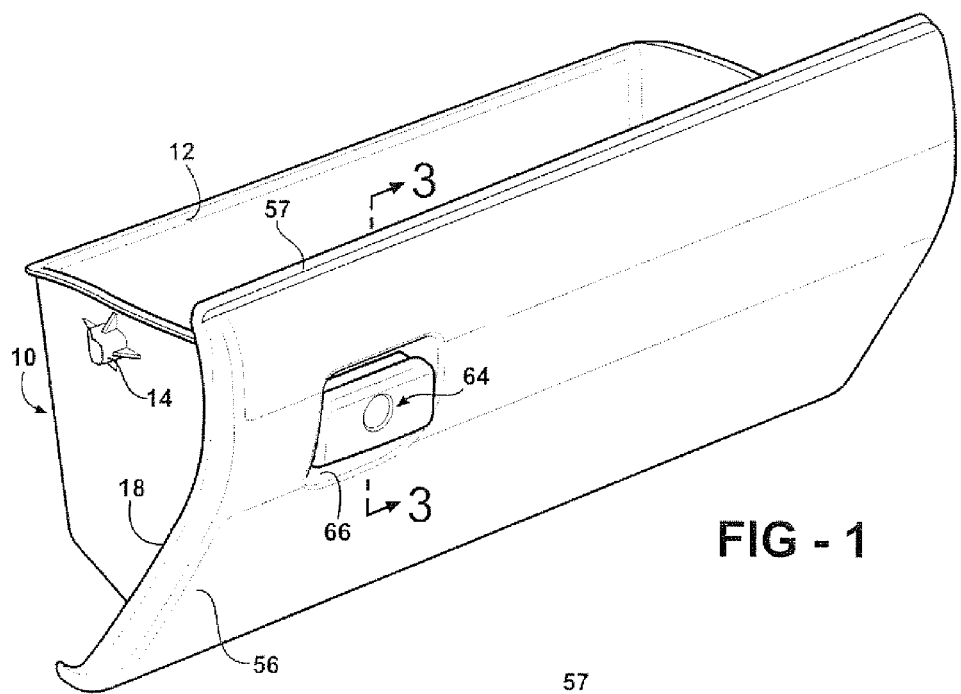
FIG. 1 is a perspective view of a glove box face and attached bin, and into which is incorporating the handle over-open support ribs according to the present invention.

Referring now to FIG. 1, a glove box construction is generally referenced at 10 according to the present invention. The glove box includes a three-dimensional, and typically three sided and open top volume-holding bin 12 which is constructed of such as an injection molded plastic. The bin 12 may further include side projecting supports, see at 14 in FIG. 1 and at 16 in FIG. 2, and which establish stop locations upon engaging opposing locations of the vehicle dash structure (not shown) upon the bin 12 being pivotally actuated outwardly from a recessed and latched arrangement within the dashboard.

An inner panel 18 secures against locations associated with a forward edge of the bin 12. As with the bin 12, the inner panel 18 is typically constructed of a plasticized material formed in an injection molding process and such that the panel 18 exhibits a specified length, width and thickness generally corresponding to a desired opening in the vehicle dashboard (again not shown).

Figure 2:
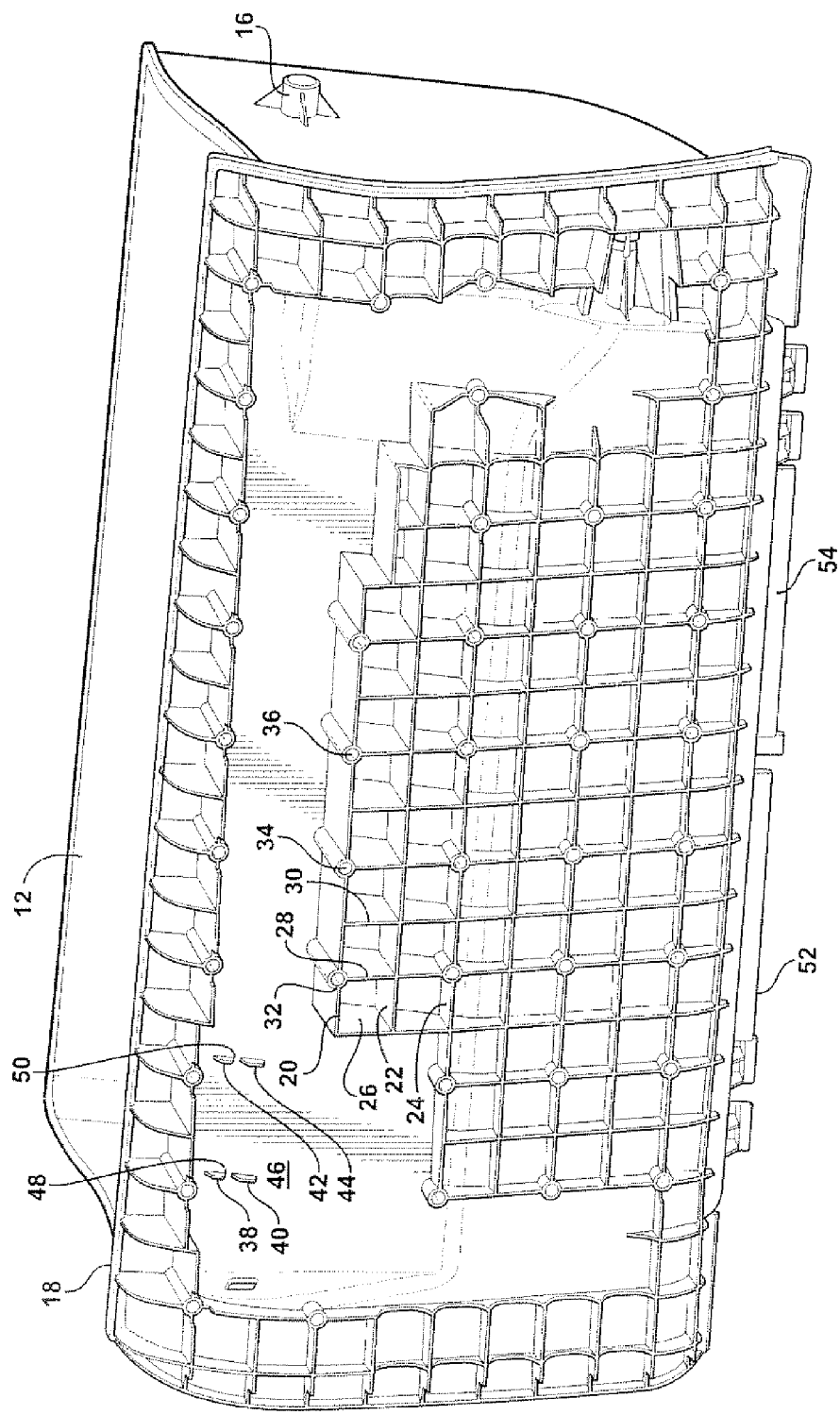
FIG. 2 is a rotated and modified perspective of the glove box structure illustrated in FIG. 1, in which the outer fascia panel is removed and in order to illustrate the arrangement of reinforcing ribs.

As best shown in FIG. 2, the injection-molded construction of the inner panel 18 is such that it includes a grid-shaped array of horizontal 20, 22, 24, et seq., and interconnected vertical 26, 28, 30, et seq. interconnected supports, or ribs, formed in a latticework pattern and at designated locations across the exposed surface area of the inner panel 18. The arrangement, location thickness and construction of the support ribs is selected according to a number of varying considerations, among which are contemplated "crashworthiness" parameters associated with the engineered design of the inner panel 18. Along these lines, the horizontal and/or vertical ribs may be removed from certain areas associated with the inner panel 18 or alternatively, may be shaped or contoured to exhibit either more or less inward (crash) resisting support based upon the desired parameters of the design.

Selected contact locations are established within intersecting web locations associated with the horizontally and vertically arrayed ribs defining the support structure of the inner panel. These locations define vibratory weld contact points for securing corresponding inwardly directed rib supports of an outer panel, and as will be subsequently described. The contact locations are further typically defined by collar shaped portions, see at 32, 34, 36 et seq. as again shown in FIG. 2, and which are defined within said exposed web locations of said inner panel.

Also illustrated at 38 & 40 and 42 & 44, respectively, are pairs of tab-shaped projections formed in spaced apart fashion upon the exposed face of the inner panel 18. As illustrated, the pairs of tab-shaped projections 38 & 40 and 42 & 44 are formed in vertically aligned and horizontally spaced fashion upon an open faced region 46 of the inner panel 18 face, this devoid of any supporting ribs.

The projections 38 & 40 and 42 & 44 are formed during the injection molding process for creating the inner panel 18, each pair defining an inwardly contoured and opposing gap location, see at 48 and 50 for each pair of projections 38 & 40 and 42 & 44, respectively. As shown in FIG. 2, the inner panel 18 further includes hinge support structure, see at 52 and 54, extending lengthwise along a lower surface thereof, and which is adapted to secure the assembled glove box 10 in pivoting fashion within the vehicle dashboard (again not shown).

An outer panel 56 substantially matches the inner panel 18 in overall configuration, including such as a similar length, width, thickness and arcuate side profile to create in sandwiching cooperation a face covering for the glove box and which establishes a flush surface relative to the vehicle dashboard. The outer panel 56 is likewise created from an injection molded process and also includes a curved perimeter extending edge, see as shown at 57 in FIGS. 1 and 3, and which creates a flush and smooth edge when secured (such as vibration welding) to the inner panel 18.

Figure 3:
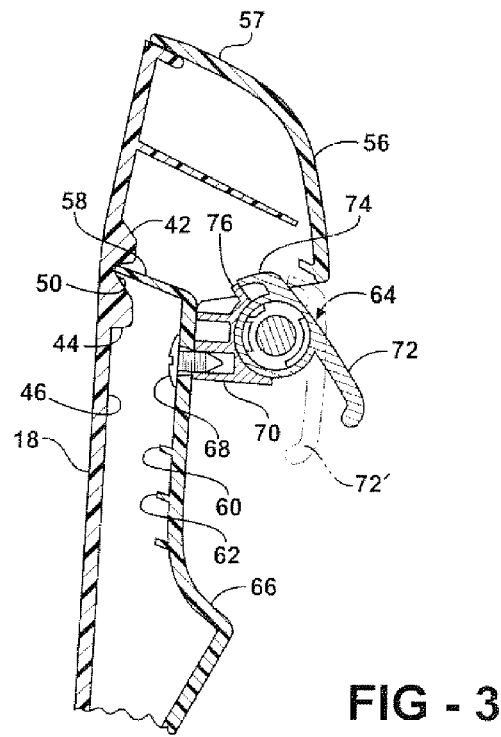
FIG. 3 is a cutaway view taken along line 3-3 of FIG. 1 and showing rotating handle mechanism in relation to the over-open support ribs and in particular their locating and reinforcing support relative to the inwardly contacting edges of structural supports associated with the outer panel.

As with the inner panel 18, the outer panel 56 includes a plurality of support ribs, see as shown by example at 58, 60, 62, et seq., in the cutaway view of FIG. 3. The support ribs each include inwardly projecting edges which contact locations along the inner panel 18 (such as for example defined by the collars 32, 34, 36, et seq.) and which facilitate the vibration welding of the outer panel 56 to the inner panel 18 as shown in FIG. 1.

Although not clearly shown, it is understood that the support/rib pattern of the outer panel 56 may exhibit either or both horizontally and vertically extending rib supports, such as referenced in relation to the inner support panel 18. Alternatively, the inwardly facing surface of the outer panel 56 may include some alternate arrangement of rib supports, and in order to provide desired design characteristics to the outer panel 56, including again crashworthiness characteristics complementing the design parameters established by the inner panel 18.

A handle mechanism, see as generally referenced at 64, is secured to an exposed, typically fascia or decorative covered, face of the outer panel 56. The handle mechanism 64 is typically mounted within a localized recessed portion 66 of the outer panel 56. As illustrated in FIG. 3, at least one fastener 68 inserts through an inside surface of the outer panel 56, and in order to engage a support 70 associated with the handle mechanism.

The handle mechanism 64 further includes a rotating lever 72 biasingly secured to the support 70 (such as by a spring or other suitable biasing component not shown). An angled projection 74 is defined in extending fashion from an end of the lever 72, and such as to be arrayed in opposite fashion with regards to a main grasping portion of the lever. A stop portion 76 projects outwardly from a location associated with the support 70 and, upon pivoting the lever 72 from its position illustrated in phantom at 72', defines a substantially unlatching condition associated with the handle.

The inwardly angled support rib 58, again associated with the outer panel 56, is located proximate to the exterior mounting location of the handle assembly 64. As previously described, repetitive unlatching rotation and/or "slamming shut" rotation, such as by the user grasping the handle, tends to result in the vibrational welds in the region of the handle (see again illustrated weld contact by angled support rib 58 contacting the inner panel surface) being broken or otherwise damaged, this further resulting in undesirable looseness or over-rotation of the handle and potential inoperability of the glove box locking mechanism.

As referenced in FIG. 3, the positioning of the pairs 38 & 40 and 42 & 44 of support tabs prevents breakage of the weld established between the inwardly angled support rib 58 and the associated contact location of the inner panel 18. As shown, the inwardly contoured and opposing gap locations, again at 48 and 50, seat therebetween the contacting edge of the lengthwise extending rib 58 (or pair of segmented ribs as may be also contemplated).

This prevents undesirable rotation of the rib 58 and resultant breakage, due again to the forces of physics imparted upon the vibrational weld connections due to rotational opening and/or slamming shut of the glove box. In this manner, actuation of the handle lever 72 does not result in over-rotation (indicative of a localized weld fracture), and with resultant loss of tactile "feel" of integrity.

Having described our invention, other additional preferred embodiments will become apparent to those skilled in the art to which it pertains, and without deviating from the scope of the appended claims:

We claim:

1. A reinforcing structure incorporated into an openable/closable glove box mounted within a vehicle dashboard, comprising:
   a three-dimensional and volume-holding bin;
   an inner panel secured to locations associated with said bin, said inner panel exhibiting an exposed plurality of support ribs;
   an outer panel substantially matching said inner panel in overall configuration and including a further plurality of support ribs opposing said support ribs of said inner panel, said inner and outer panels being welded together along contact locations established between said support ribs, said outer panel exhibiting an exposed face when the bin is mounted within the dashboard; and
   a handle mechanism securing to said exposed face of said outer panel, proximate to at least one welded rib location established between said inner and outer panels and which further comprises an additional support rib extending between said outer and inner panels proximate said handle mechanism.

2. The reinforcing structure as described in claim 1, further comprising first and second pairs of tab-shaped projections being formed in spaced apart fashion upon said inner panel, said additional support rib extending from said outer panel and seating within gap locations defined between said pairs of tab-shaped projections, at which said additional support rib is welded to said inner panel.

3. The reinforcing structure as described in claim 2, said pairs of tab-shaped projections being formed in vertically aligned and horizontally spaced fashion during an injection molding process for creating said inner panel.

4. The reinforcing structure as described in claim 1, said exposed surface of said outer panel further comprising a recessed area against which is mounted said handle mechanism, at least one fastener inserting through an inside surface of said outer panel and engaging a support associated with said handle.

5. The reinforcing structure as described in claim 4, said handle mechanism further comprising, a rotating lever biasingly secured to said support, an angled projection defined on said lever in opposite fashion with regards to a grasping portion, a stop projecting from said support and defining a substantially unlatching condition associated with said handle.

6. The reinforcing structure as described in claim 1, said inner panel further comprising hinge supports extending along a lower surface thereof and which are adapted to secure the glove box in pivoting fashion within the vehicle dashboard.

7. The reinforcing structure as described in claim 6, said bin further comprising at least one side projecting support adapted to contact said dash upon outward pivoting of said glove box and in order to define a fully opened condition.

8. The reinforcing structure as described in claim 1, each of said inner and outer panels further comprising a grid of interconnecting support ribs, selected contact locations established within web locations of said inner panel support grid defining vibratory weld points for securing corresponding inwardly directed rib supports of said outer panel.

9. The reinforcing structure as described in claim 8, said contact locations further comprising collar shaped portions defined within said exposed web locations of said inner panel.

10. The reinforcing structure as described in claim 1, each of said bin, inner panel and outer panel having a specified shape and size and being constructed of a plasticized material in an injection molded process.

11. A pivotally actuating glove box mounted within a vehicle dashboard and exhibiting reinforcing support proximate a mounting location of a handle mechanism, comprising:

a three-dimensional and volume-holding bin;

an inner panel secured to locations associated with said bin, at least one projecting portion defined upon a surface of said inner panel and in a direction opposite said bin;

an outer panel substantially matching said inner panel in overall configuration and including a plurality of support ribs contacting said inner panel, said inner and outer panels being welded together along contact locations established between said panels, placement of said projecting portions coinciding with contact locations associated with at least one inwardly directed support rib of said outer panel; and the handle mechanism securing to an exposed face of said outer panel, proximate to an additional support rib extending between said outer and inner panels.

12. The glove box as described in claim 11, further comprising first and second pairs of tab-shaped projections being formed in spaced apart fashion upon said inner panel, said additional support rib extending from said outer panel and seating within gap locations defined between said pairs of tab-shaped projections, at which said additional support rib is welded to said inner panel.

13. The glove box as described in claim 12, said pairs of tab-shaped projections being formed in vertically aligned and horizontally spaced fashion during an injection molding process for creating said inner panel.

14. The glove box as described in claim 11, said exposed surface of said outer panel further comprising a recessed area against which is mounted the handle mechanism, at least one fastener inserting through an inside surface of said outer panel and engaging a support associated with the handle.

15. The glove box as described in claim 14, the handle mechanism further including a rotating lever biasingly secured to the support, an angled projection defined on the lever in opposite fashion with regards to a grasping portion, a stop portion projecting from the support and defining a substantially unlatching condition associated with the handle.

16. The glove box as described in claim 11, said inner panel further comprising hinge supports extending along a lower surface thereof and which are adapted to secure said bin in pivoting fashion within the vehicle dashboard.

17. The glove box as described in claim 16, said bin further comprising at least one side projecting support adapted to contact the dash upon outward pivoting of said bin and in order to define a fully opened condition.

18. The glove box as described in claim 11, each of said inner and outer panels further comprising a grid of interconnecting support ribs, selected contact locations established within web locations of said inner panel support grid defining vibratory weld points for securing corresponding inwardly directed rib supports of said outer panel.

19. The glove box as described in claim 18, said contact locations further comprising collar shaped portions defined within said exposed web locations of said inner panel.

20. The glove box as described in claim 11, each of said bin, inner panel and outer panel having a specified shape and size and being constructed of a plasticized material in an injection molded process.

* * * * *

UNITED STATES PATENT AND TRADEMARK OFFICE
CERTIFICATE OF CORRECTION

PATENT NO. : 7,422,261 B2 Page 1 of 1
APPLICATION NO. : 11/348394
DATED : September 9, 2008
INVENTOR(S) : Kerry Scott Zellner, Jr. et al.

It is certified that error appears in the above-identified patent and that said Letters Patent is hereby corrected as shown below:

Column 5, line 8, after "comprising" delete comma

Column 5, line 11, after "stop" insert --portion--

Signed and Sealed this

Eleventh Day of November, 2008

JON W. DUDAS
*Director of the United States Patent and Trademark Office*